June 18, 1935.  A. M. MARKS  2,005,153
SYNCHRONIZING SYSTEM
Filed Dec. 9, 1931
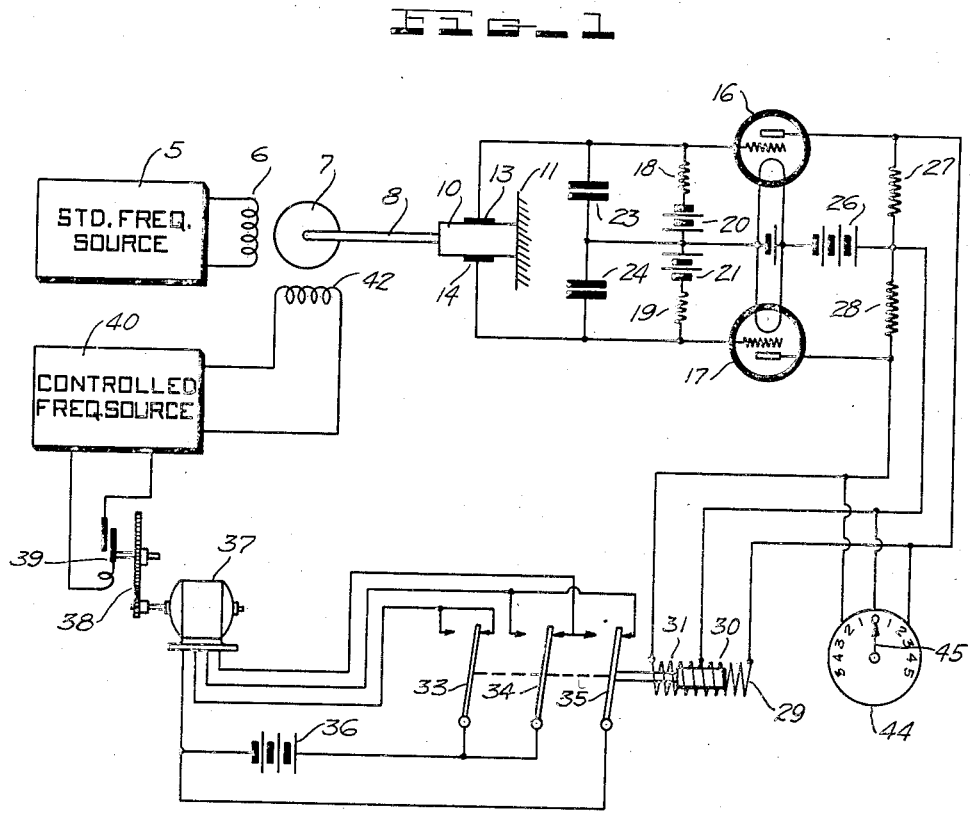
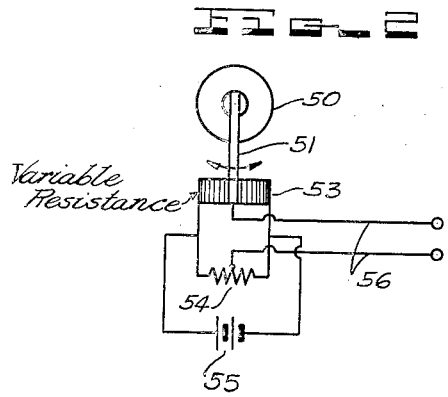
INVENTOR
Alvin M. Marks
BY
ATTORNEY Patented June 18, 1935

2,005,153

UNITED STATES PATENT OFFICE 2,005,153

SYNCHRONIZING SYSTEM

Alvin M. Marks, Brooklyn, N. Y., assignor to Communication Patents, Inc., New York, N. Y., a corporation of Delaware Application December 9, 1931, Serial No. 579,943

8 Claims. (Cl. 250—36)

This invention relates to electrical systems and particularly to synchronizing systems in which two frequencies are to be maintained constant or in a definite phase relationship with respect to one another.

Synchronizing systems for power generators with which alternators are kept in step, and synchronizers for multiplex signaling and television transmitters and receivers are well known in the art. These systems, however, are generally complex and require considerable apparatus. The present invention is an improvement over former methods of indicating phase displacement and controlling the sources of current, since its principles of operation are fundamental and it operates through mediums well known for their accuracy and stability.

An object of this invention is to maintain two alternating currents in a definite phase relationship with respect to one another.

Another object of the invention is to utilize piezoelectric crystals to provide the determining medium for an out-of-phase condition both as to magnitude and direction.

A further object of the invention is to simplify the determination of an out-of-phase condition by employing simple circuit elements.

The invention in brief, contemplates producing a rotating field, the strength of which is a measure of "off-synchronism" or phase shift and which acts upon an element positioned therein. The forces on this element are transmitted to a piezoelectric crystal to generate voltages comparable to the stress produced therein, or to a non-generating electrical element to vary its value. The stress in the crystal or change in the element is proportional in magnitude, and has the direction, of the change in phase shift between the two currents. The generated energy from the crystal is utilized to indicate the magnitude and direction as well as control one or both of the sources. The control is such as to maintain one of the sources in step with the other regardless of the source which varies.

The correction of frequency can be made in any of several manners well known to those skilled in the art, either wholly electrically, wholly mechanically, or combinations of both, one combination form being disclosed in the specification. It is to be understood, however, that the output of the crystal may directly control one of the frequency sources, as well as through amplifiers and relays. For instance, any current variation through an inductance which forms part of the tuned circuit of an oscillator and which varies this inductance will vary the frequency of the oscillator.

The details of the invention will be more fully understood by reference to the following description in conjunction with the accompanying drawing, in which;

Fig. 1 shows the invention embodied in a crystal type of control circuit, and;

Fig. 2 shows another modification of control in which a non-generating element is employed to determine direction and magnitude of phase changes between alternating currents.

Referring to Fig. 1, a standard frequency source 5 may be any source of alternating current such as a vacuum tube oscillator or mechanical generator. Such a source may, for instance, be that used for synchronizing a television receiver with its transmitter. The output of this frequency source is impressed on a winding 6 forming part of the stator of a quadrature field winding having a rotor element 7 with a shaft 8. One end of the shaft 8 is fixed to a crystal 10, the crystal being fixed to a support 11 in a manner to permit stresses to be set up therein by torsion in the shaft. Electrodes 13 and 14 are mounted adjacent to the crystal 10 and are connected to a push-pull thermionic system having vacuum tubes 16 and 17.

This bridge arrangement includes grid resistances 18 and 19 with associate grid biasing batteries 20 and 21 respectively. Appropriate bridging condensers 23 and 24 are shown in shunt to the batteries and resistances just mentioned. A common anode voltage source 26 supplies anode potential to the anodes of tubes 16 and 17 through resistances 27 and 28 respectively, the voltage across the resistances being impressed upon a tapped relay winding 29 having two portions 30 and 31. The respective elements of each portion of this bridge arrangement are made as nearly equal as possible in order to maintain a balanced system so that no field results at relay 29 with no potential difference at the electrodes 13 and 14.

On the armature of the relay 29 are three contacting members 33, 34 and 35, which operate in obvious circuits to reverse the power supplied from a source 36 to a motor 37 thereby reversing its direction of rotation. The motor is geared through a gear train 38 to a variable condenser 39 for varying the tuning of a second frequency source 40. It is to be understood of course, that the motor may vary an inductance for the purpose of tuning the controlled frequency source or the change in frequency may be accomplished in many ways well known in the art.

The output circuit from the controlled frequency source 40 supplies to a second field winding 42 in quadrature to field winding 6, currents which would be at the proper frequency and phase produce no rotating field and consequently no turning moment on the rotor 7. Should there, however, occur a shift in phase in either source 5 or 40 a rotating field is produced, the direction of which follows the direction of phase shift of either of the sources. The rotating field produces a turning moment in the rotor which is transmitted through the shaft 8 to the crystal 10 producing therein stresses which exhibit themselves as various values of potential differences between the electrodes 13 and 14. The polarity of these voltages depend upon the direction of the twisting moment in the crystal. The resulting voltages produced on the electrodes 13 and 14 unbalance the push-pull bridge circuit producing currents in the relay 29 to operate its armature in either of the two possible directions. That is, should the control frequency source 40 have its phase retarded, a stress would be placed on the crystal 10 in such a manner as to operate motor 37 in a direction to tune or shift the frequency from the source 40 to its proper position. Should the source 5 tend to vary, the proper stress will be placed on the crystal 10 to cause the source 40 to be tuned to follow the change in the source 5.

The above control circuit operates as to direction only and will continue to shift the frequency in either of the two directions until the relay becomes balanced and the armatures return to their normal position which is intermediate the contacts. However, it is to be understood that the amount of phase shift between the sources produces a commensurate torque and stress on the crystal 10 which may be measured to give an indication of the exact amount of the phase shift between the respective currents. Without directly employing the magnitude of "off-synchronism" to control one of the frequency sources, there is shown, however, a meter 44 having a pointer 45 which will respond to the phase shift both as to direction and magnitude.

Referring to Fig. 2, another modification is shown in which a rotor 50 with a shaft 51 are comparable to rotor 7 and shaft 8 of Fig. 1. The controlling element in this arrangement, however, is a two-way resistance element 53 which may be either a wire-around potentiometer resistance or one of the carbon pile type, in which the resistance varies with pressure. The potentiometer 53 forms two arms of the bridge circuit in which a tapped resistance 54 forms the other two arms. From a voltage source 55 connections are made to the junctions of the resistances 53 and 54 while conductors 56 are connected to the mid-points of each element. Any change in resistance occurring in either portion of the resistance 53 causes a current to flow in conductors 56, the direction depending upon the direction of resistance change.

This system operates on the same principle as that of Fig. 1 except that the stresses set up in the shaft 51 produced by the rotating field surrounding the rotor 50 produces an unbalance in the bridge which is proportional to the pressure or torque in the shaft 51 and consequently the amount of phase shift to be measured. The output current in the conductors 56 may operate relays, motors, change the value of impedance elements in tuned circuits, or make corrections in any well known manner.

It is to be understood that the above control systems are shown solely for the purpose of illustrating the principle of the invention and other control systems will be apparent to those skilled in the art. The scope of the invention is defined by the appended claims.

What is claimed is:

1. In a synchronizing system, a source of current having a definite frequency, means for impressing said current on an inductance device to produce a field, another alternating source of current having its output impressed upon said inductance device to affect said field, said sources having normally the same frequency, means within said field of said inductance device to obtain a turning moment proportional to any shift in the frequency of the currents from said sources, a piezo electric device mechanically connected to said last mentioned means for translating said turning moment into energy proportional to said turning moment, and means for impressing said energy on a frequency adjusting circuit of one of said sources.

2. In a synchronizing system, a standard frequency source of alternating current, a variable second source of alternating current having a tuning means to be maintained in synchronism with said standard source of frequency, a quadrature phase system having impressed thereon the outputs of said frequency sources for producing a rotating field in a direction and of a magnitude corresponding to the amount of phase shift between the currents from said sources, a piezoelectric crystal, a rotor mounted within said field mechanically connected to said piezo-electric crystal, means for obtaining potential differences from said crystal comparable to the twisting moment of said rotor, means for impressing said potential differences on a control system for varying said tuning means.

3. In a synchronizing system, a motor having quadrature phase windings a piezoelectric crystal, a rotor for said motor, said rotor being mechanically connected to said piezo-electric crystal, an alternating current source feeding one of said windings, a second alternating current source feeding another of said windings, means for varying the frequency of one of said sources, and means for utilizing the voltages generated by said crystal caused by turning moments in said rotor for adjusting said frequency varying means.

4. In a synchronizing system, a standard frequency source of alternating current, a second source of alternating current to be kept in phase with said standard frequency source, quadrature field windings supplied from said sources, a piezoelectric element having electrodes, a rotor mounted within said field windings mechanically connected to said piezo-electric element, a vacuum tube circuit the input of which is connected to said electrodes of said element, tuning means for said second source of alternating current and a relay connected in the output circuit of said tube circuit, said relay operating said tuning means in a direction corresponding to the shift in phase of either of said sources with respect to the other.

5. A method of controlling the frequency of the current from an electrical generating system, comprising creating a rotating field comparable in magnitude and direction to the phase shift between said current and a current having a standard frequency, generating with said field differential currents proportional to and in the direction of said field, and applying said currents to the adjustment of the frequency of said electrical generating system.

6. A method of synchronizing two frequency sources comprising, producing a rotating field comparable in magnitude and direction to the shift in frequency between the currents from said sources, generating electrical voltages proportional in magnitude and in direction to said field, and controlling currents proportional to said voltages to adjust the frequency of at least one of said sources.

7. In a synchronizing system, a plurality of current sources having normally the same frequency, an inductance device upon which the currents from said sources are impressed to produce a rotating field in an out-of-phase relationship, means for producing a turning moment from said rotating field produced by said inductance device when the frequencies from said currents are out of phase, a piezoelectric device attached to said last mentioned means for producing voltages proportional to the stress produced in said device by said turning moment, and means for utilizing said voltages for controlling the frequency of at least one of said frequency sources.

8. In a synchronizing system, a plurality of current sources having definite frequencies, a plurality of stator windings upon which the currents from said sources are impressed, means positioned in the field of said stator windings for poducing a turning moment, a piezo electric device attached to said last mentioned means for translating said turning moment into electrical energy of a value proportional to said turning moment, and an indicating device for utilizing said energy for determining the direction and amount of phase shift between said currents.

ALVIN M. MARKS.